United States Patent Office 3,484,284
Patented Dec. 16, 1969

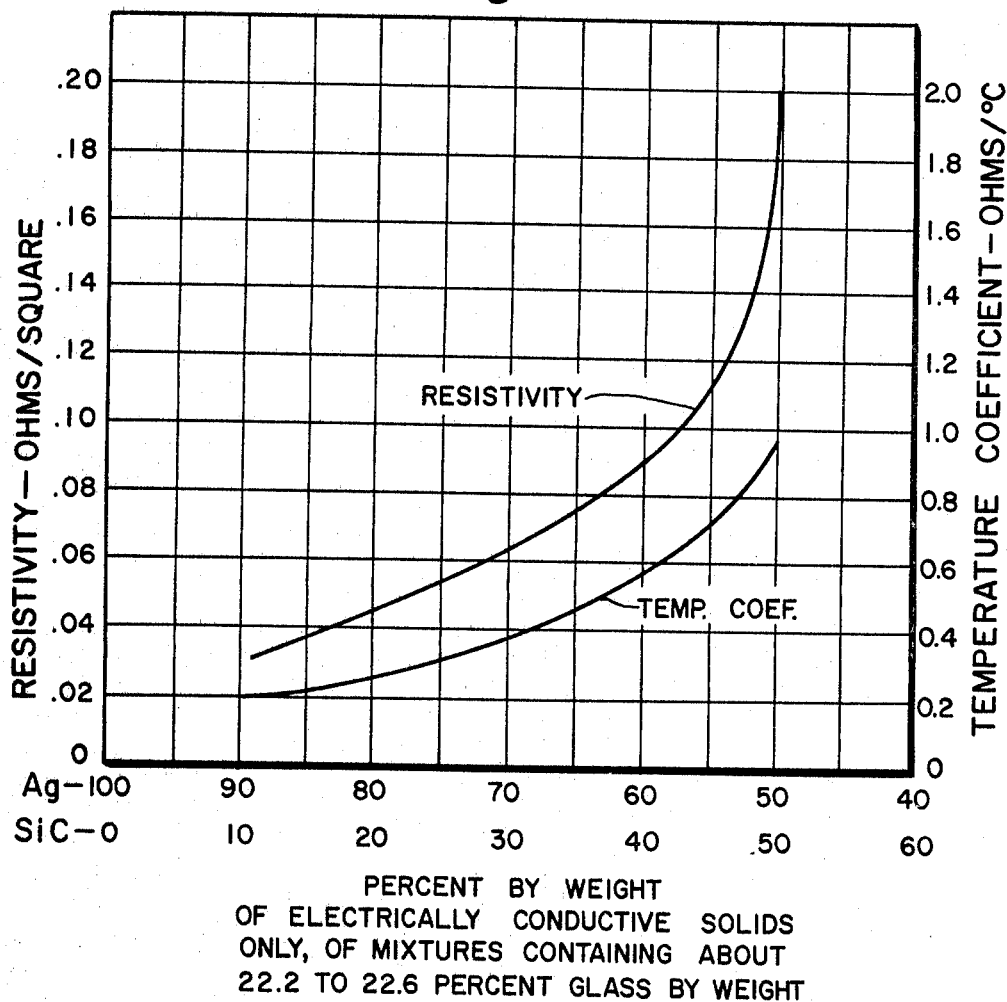

3,484,284
ELECTROCONDUCTIVE COMPOSITION AND METHOD
Harold F. Dates, Corning, N.Y., and James J. Eaton, Minneapolis, Minn., assignors to Corning Glass Works, Corning, N.Y., a corporation of New York
Continuation of application Ser. No. 466,408, June 23, 1965, which is a continuation of application Ser. No. 142,975, Oct. 4, 1961. This application Aug. 15, 1967, Ser. No. 660,659
Int. Cl. B44d 1/18, 1/02
U.S. Cl. 117—221     29 Claims

ABSTRACT OF THE DISCLOSURE

Electroconductive compositions for application to non-conductive substrates suitable for use as heating elements, resistive coatings, capacitor plates and the like consisting essentially of 10% to 50% by weight of non-conducting ceramic or glass, 20% to 85% by weight of selected metals, and up to 60% by weight of selected semiconductors, the compositions having resistivities of up to about 0.20 ohm per square.

---

This application is a continuation of application Ser. No. 466,408 filed June 23, 1965 and now abandoned which was a continuation of application Ser. No. 142,975 filed Oct. 4, 1961 and now abandoned.

BACKGROUND OF THE INVENTION

Electroconductive coatings are well known in the art. Such coatings generally consist of metallic and/or oxide semiconductor compositions with such other constituents as fillers, opacifiers, fluxes and vehicles. The compositions are varied to produce desired results. For example, metals are used where low resistances are desired while oxide semiconductors are used where high resistances are desired. These characteristics are further modified by changing the quantity of metal or oxide semiconductors and/or by combining them with fillers which are more or less conductive or non-conductive. In addition, the resistance is varied by the length of the coating path as well as its thickness. Such coatings have been applied in very thin films by various methods such as sputtering, evaporating, brushing, spraying, stenciling, dipping, silk screening and others. In most applications the coating thickness varies from slightly greater than the molecular size of the material to several thousandths of an inch, depending on the resistance required. Such coatings are generally applied to non-conductive substrates and are bonded or fused to the substrates by subsequent air drying and/or kiln firing.

As used herein and as is well known in the art, the term "square" is dimensionless, that is resistivity in ohms per square is independent of the size of the square. For example, the value of resistivity of a given material is the same in ohms per square cm., square inch, or square mile.

By the term semiconductor as used herein is meant a relatively high electrical resistance inorganic material used as a constituent of an electroconductive mixture to increase its resistivity and is defined as a material having a conductivity in the range of $10^{-6}$ to 10 mhos/cm. A conductor is defined as a material having a conductivity more than 10 mhos/cm., while an insulator is defined as a material having a conductivity less than $10^{-6}$ mhos/cm. By oxide semiconductor is meant a binary or complex oxidic compound of the polar type in which electropositive and electronegative constituents can be clearly distinguished and may be considered as a solid with an ionic lattice. At least some of the metal ions in the oxidic compound are derived from an element or elements belonging to the transition series, for example elements ranging from titanium to zinc in the periodic table. Such oxide semiconductors are in extensive use for various purposes such as sintered bodies produced by ceramic techniques. Solid phase reactions result from the high temperature sintering, producing ions of the same element with different valences at equivalent lattice points in the ionic lattice.

Electroconductive compositions are used in the forming of heating elements, resistive elements, printed circuits, conductive elements and the like. One of the more important properties, which is necessary for compositions to be used for such purposes, is a low or zero temperature coefficient of resistance (henceinafter referred to as "temperature coefficient"). As another important property the resistivity of the compositions must be variable over a wide range by combining basic constituents in varying amounts. Furthermore, such compositions must be capable of being formed as viscous mixtures suitable for application in a uniform thickness by silk screening, printing or other suitable large scale production methods. In addition, the compositions when fired must firmly adhere to the substrate to which they are applied, as well as to each other. Other important properties are high power capacity, low contact resistance for mechanical attachment of electrical leads, resistance to mechanical abrasion and chemical durability so that the materials which come in contact with the finished article do not react, combine or otherwise chemically deteriorate the coating during prolonged periods of exposure thereto.

It has been found that heretofore known electroconductive compositions, although suitable for some applications, do not have all of the above-noted properties. For example, compositions having a high glass content have high resistivity, low power capacity and high thermal expansion, while compositions having a high metallic content have low resistivity and cannot easily be firmly bonded when applied by a printing method or the like. Compositions having a high semiconductor content have a high temperature coefficient, high resistivity and low power capacity. In addition, compositions having organic constituents cannot generally be used at elevated temperatures and sometimes have poor chemical durability. Accordingly, it is an object of this invention to provide electroconductive compositions which may be formed as a viscous mixture, the resistivity of which can be varied over a wide range by combining basic constituents in varying amounts.

Another object of this invention is to provide electroconductive compositions having a low temperature coefficient.

A further object is to provide electroconductive compositions which may be applied by the silk screen process in a uniform thickness.

Still another object is to provide electroconductive compositions which can be firmly bonded or fused to each other or to a non-conductive substrate.

A still further object is to provide electroconductive compositions suitable for forming heating elements.

Another object is to provide electroconductive compositions suitable for forming printed circuits.

Still another object is to provide electroconductive compositions having high power capacity, low contact resistance, resistance to mechanical abrasion and chemical durability.

Additional objects, features and advantages of the present invention will become apparent to those skilled in the art from the drawings and the following description.

SUMMARY OF THE INVENTION

In general, the objects of this invention are achieved by preparing a finely divided mixture of at least one conductive metal, a substantially non-conducting ceramic or glass, and a semiconductor as desired, together with a suitable moistening agent or vehicle, said non-conducting ceramic or glass comprising not more than 50% by weight of the total remaining after the said moistening agent or vehicle is volatilized through firing.

BRIEF DESCRIPTION OF THE DRAWINGS

FIGURES 1 through 3 are graphs illustrating various electrical properties of compositions within the scope of this invention.

DETAILED DESCRIPTION

Figure 1:
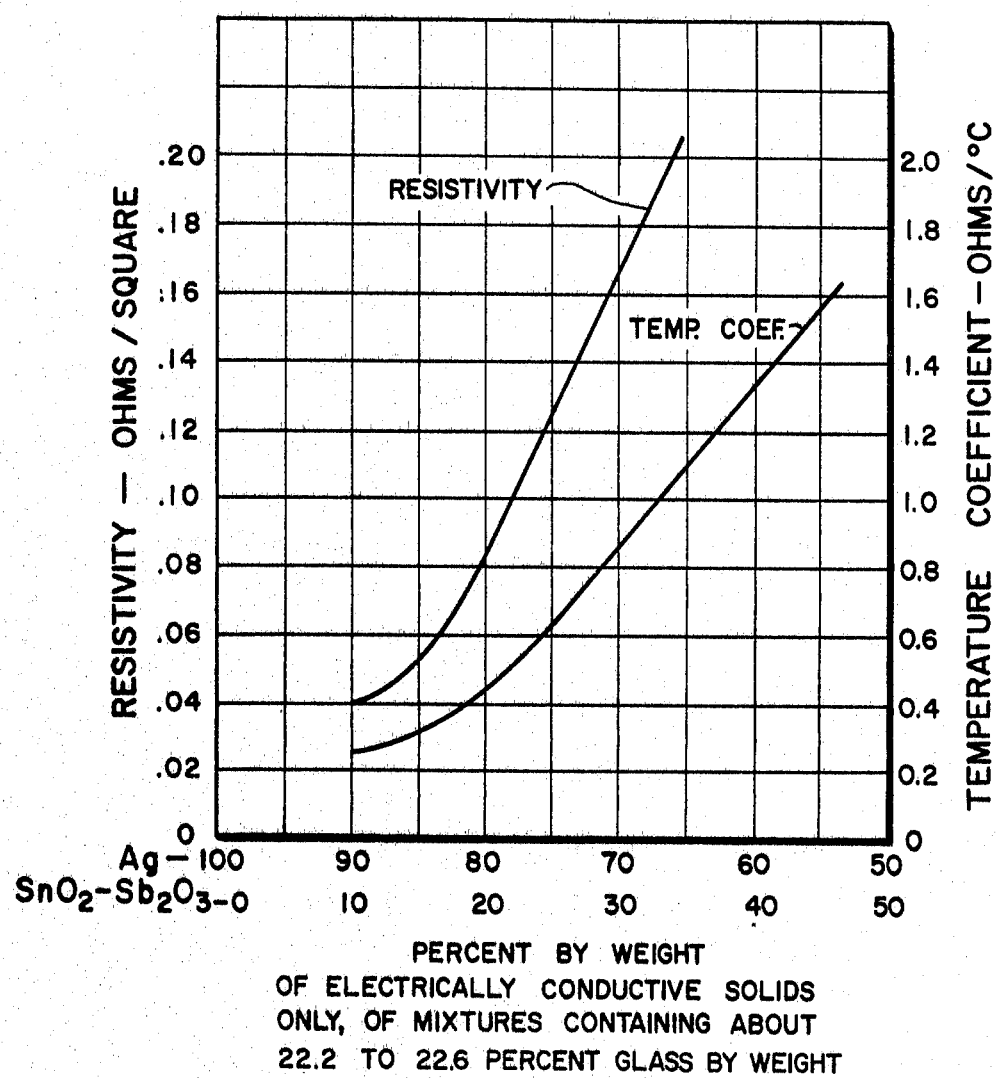

FIGURE 1 illustrates the resistivity and temperature coefficients plotted against percent by weight of electrically conductive solids only of mixtures of silver, tin-antimony oxides and glass, including the mixtures of Examples 5, 6, and 7 of Table III hereof, said mixtures containing from about 22.2 to 22.6 percent glass by weight.

Figure 2:
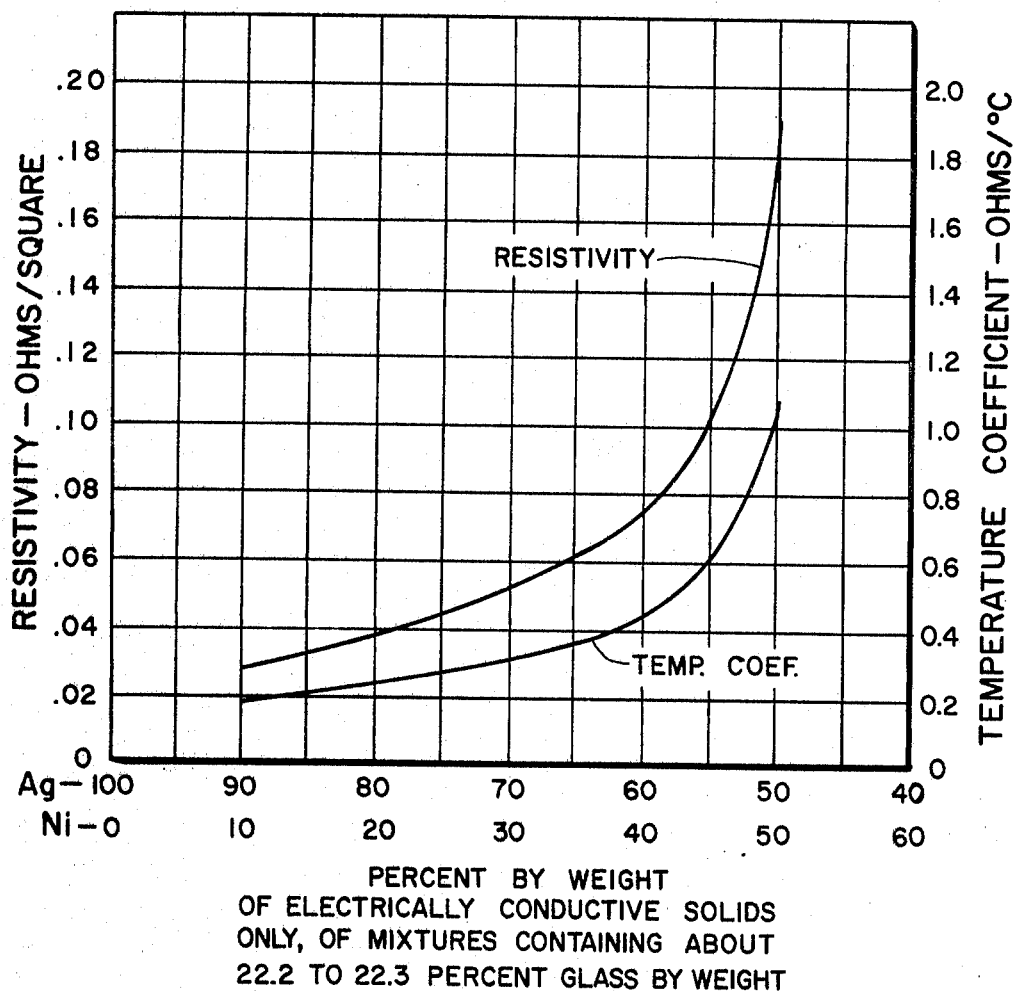

FIGURE 2 illustrates the resistivity and temperature coefficients plotted against percent by weight of electrically conductive solids only of silver, nickel and glass mixtures, including the mixtures of Examples 8, 9, and 10 of Table III hereof, said mixtures containing from about 22.2 to 22.3 percent glass by weight.

FIGURE 3 illustrates the resistivity and temperature coefficients plotted against percent by weight of electrically conductive solids only of silver, silicon carbide and glass mixtures, including the mixtures of Examples 11, 12, and 13 of Table III hereof, said mixtures containing from about 22.2 to 22.6 percent glass by weight.

The electro-conductive material of the invention comprises a fused mixture of noble and/or non-noble metals, a non-conducting ceramic or glass and as desired a semiconductor such as, tin, oxide, tin-antimony oxide, silicon carbide and the like. Although the ceramic or glass composition is not critical its selection usually depends on fusion temperature, coefficient of thermal expansion, fluidity, solubility and the like, and it must neither absorb moisture nor have a coalescing temperature higher than the melting point of the metals or semiconductors mixed therewith. One familiar with the art can readily select a proper ceramic or glass. Table I illustrates glass compositions found suitable for use in practicing the invention.

TABLE I

|  | A | B |
|---|---|---|
| PbO | 75.0 | |
| $B_2O_3$ | 11.0 | 22.5 |
| $Al_2O_3$ | 11.0 | |
| $SiO_2$ | 3.0 | 12.5 |
| ZnO | | 65.0 |

Metals suitable for use in the invention are those metals of the Periodic Table included in period 3, groups 2 and 3, and in periods 4, 5, and 6, groups 1b to 6b inclusive, 3a to 6a inclusive, and group 8 but excluding the lanthanum series elements. These metals are aluminum, magnesium, copper, silver, gold, zinc, cadmium, mercury, gallium, indium, thallium, germanium, tin, lead, antimony, bismuth, tellurium, polonium, scandium, yttrium, titanium, zirconium, hafnium, vanadium, niobium, tantalum, chromium, molybdenum, tungsten, iron, ruthenium, osmium, cobalt, rhodium, iridium, nickel, palladium, and platinum. The invention, however, is not limited to these metals since mixtures and alloys thereof can also be used. Examples of noble and non-noble metals particularly suitable for use in the invention are silver, gold, platinum, palladium, rhodium, nickel, chromium, cadmium, copper, aluminum and the like.

Semiconductors suitable for use in the invention are compounds as follows: silicon carbide, metal oxides, tellurides, stannates, antimonates, titanates, vanadates, arsenates, manganates, molybdates and the like as well as mixtures thereof. It has been found that a particularly suitable tin-antimony oxide semiconductor can be prepared by mixing 78.8% by weight $SnO_2$ and 21.2% by weight $Sb_2O_3$ in a ball mill for about 1½ hours, firing the mixture at a rate of 10° C. per minute and 25° C. to 1400° C. and maintaining the 1400° C. temperature for 1 hour, thereafter cooling the mixture at furnace rate and regrinding to a 325 mesh size. A mixture prepared in this manner has a resistivity of about 1000 ohms per square and is the tin-antimony oxide semiconductor illustrated in Table II. Another suitable semiconductor may be prepared by addition of about 0.5% by weight of $NH_4 \cdot HF_2$ to the above batch. The resistivity of this semiconductor is about 40 ohms per square. Additions of up to 1% by weight of $NH_4 \cdot HF_2$ are suitable for present purposes to vary the resistivity of the above semiconductors.

A vehicle or moistening agent is required to form the composition as a viscous mixture. Although it is not critical, its volatilization temperature, fluidity and the like must be considered. In addition, a vehicle must be selected which does not form bubbles and the like while being volatilized. Examples of suitable vehicles are synthetic resins such as acrylics, polystyrenes and the like, as well as ethyl cellulose, methyl cellulose, nitro cellulose and linseed oil. One familiar with the art can readily determine a suitable vehicle for a particular application.

The mixtures used in forming the electroconductive materials of this invention are predominantly metals or metals and semiconductors. Glass in quantities greater than 50% by weight yields compositions having high resistivity and low power capacity, as well as having high thermal expansions, making them unsuitable for the objects of this invention. The particular proportion of each of the constituents utilized in a specific electroconductive material will depend upon the desired value of resistance, power consumption, temperature coefficient and the like. The objects of the invention can be achieved by the range of proportions of the fired material of about 10% to 50% by weight of glass, 20% to 85% by weight of metal and 0 to 60% by weight of semiconductors, although the preferred ranges of this invention are 20% to 25% by weight of glass, 35% to 80% by weight of metal and 0% to 40% by weight of semiconductor. The above percentages are those of the fired compositions after all organic materials have been volatilized as will be readily seen and understood from the graphs of FIGURES 1, 2, and 3, as well as Table III hereof, the resistivities of compositions suitable for purposes of this invention will be up to about and including 0.20 ohm per square.

Table II sets forth examples of several batch compositions in weight percent which illustrate the objects of this invention but are not limitations thereon. The glass used is of the compositions illustrated in Table I.

gold, platinum, palladium, rhodium, nickel, chromium, cadmium, copper and aluminum.

TABLE II

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Glass Type A | 10.6 | 9.6 | 8.9 | | 12.5 | 12.5 | 12.5 | 12.6 | 12.6 | 12.6 | 12.5 | 12.5 | 12.5 |
| Glass Type B | | | | 9.6 | | | | | | | | | |
| Silver | 37.4 | 33.5 | 31.1 | 33.5 | 39.4 | 35.0 | 21.9 | 35.0 | 21.9 | 39.4 | 39.4 | 30.6 | 26.2 |
| Tin-antimony oxide semiconductors | | | | | 4.4 | 8.6 | 21.9 | | | | | | |
| Nickel | | | | | | | | 8.8 | 21.9 | 4.4 | | | |
| Silicon carbide | | | | | | | | | | | 4.4 | 12.1 | 17.5 |
| Vehicle, ethyl cellulose | 52.0 | 56.9 | 60.0 | 56.9 | 43.7 | 43.9 | 43.7 | 43.6 | 43.6 | 43.6 | 43.7 | 43.8 | 43.8 |

Table III sets forth the compositions of the fired electro-conductive materials computed from the batches in weight percent, as well as some of their properties.

TABLE III

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Glass | 22.2 | 22.3 | 22.2 | 22.3 | 22.6 | 22.3 | 22.2 | 22.2 | 22.2 | 22.3 | 22.6 | 22.2 | 22.2 |
| Silver | 77.8 | 77.7 | 77.8 | 77.7 | 69.6 | 62.4 | 38.9 | 62.1 | 38.9 | 69.9 | 69.6 | 54.5 | 46.6 |
| Tin-antimony oxide semiconductor | | | | | 7.8 | 15.3 | 38.9 | | | | | | |
| Nickel | | | | | | | | 15.6 | 38.9 | 7.8 | | | |
| Silicon carbide | | | | | | | | | | | 7.8 | 23.3 | 31.2 |
| Resistivity, ohms/square | 0.030 | 0.048 | 0.067 | 0.048 | 0.040 | 0.082 | | 0.038 | 0.188 | 0.028 | 0.031 | 0.064 | 0.090 |
| Temperature coeff. ohms/° C | | | | | 0.26 | 0.44 | | 0.25 | 1.08 | 0.19 | 0.20 | 0.38 | 0.57 |

A preferred embodiment of this invention is a heating element made of the composition illustrated in Example 6. This composition is prepared by mixing with a mechanical stirrer 35.0% by weight of silver in flake form having about a 300 mesh size, 8.6% by weight of a tin-antimony oxide semiconductor, of the type hereinbefore described, having a 325 mesh size, 12.5% by weight of Type A glass, as illustrated in Table I, having a 325 mesh size and 43.9% by weight of ethyl cellulose vehicle, until the mixture has a viscosity of about 75 seconds as measured by a number 20 orifice in a Parlon viscometer. The heating element may then either be formed by silk screening directly on a non-conducting substrate, such as a warming dish, or be formed as a decalcomania with the transferable portion thereof being subsequently transferred to said non-conducting substrate. The element so formed is then air dried. The assembly is then fired by placing it on a conveyor and passing it through a temperature zoned kiln, which zones are maintained at 400° C., 535° C. and 735° C. Approximately four (4) minutes are required for the assembly to pass through each zone and it is heated at the rate of about 65° C. per minute in the 400° C. and 735° C. zones and about 70° C. per minute in the 535° C. zone. During this firing the assembly reaches a temperature of about 730° C. and the vehicle as well as any other organic materials are volatilized. The assembly is then subjected to pressurized streams of air for a short time and thereafter allowed to air cool.

We claim:

1. An electroconductive material having a resistivity of up to about 0.20 ohm per square consisting essentially of about 10% to 50% by weight of a substantially non-conducting glass, 20% to 85% by weight of at least one metal selected from the group consisting of aluminum, magnesium, copper, silver, gold, zinc, cadmium, mercury, gallium, indium, thallium, germanium, tin, lead, antimony, bismuth, tellurium, polonium, scandium, yttrium, titanium, zirconium, hafnium, vanadium, niobium, tantalum, chromium, molybdenum, tungsten, iron, ruthenium, osmium, cobalt, rhodium, iridium, nickel, palladium, and platinum, an effective amount up to 60% by weight of at least one semiconductor selected from the group consisting of SiC, $SnO_2$, and $Sb_2O_3$, effective to increase the electrical resistivity of said material without said semiconductor, and 0 to 1% by weight of $NH_4 \cdot HF_2$.

2. The electroconductive material of claim 1 wherein said $NH_4 \cdot HF_2$ is an essential ingredient and is present in an amount up to 1% by weight.

3. The electroconductive material of claim 1 wherein said metal is selected from the group consisting of silver, gold, platinum, palladium, rhodium, nickel, chromium, cadmium, copper and aluminum.

4. The electroconductive material of claim 3 wherein at least one metal is silver.

5. The electroconductive material of claim 3 including at least two metals of which at least one metal is silver and one is nickel.

6. The electroconductive material of claim 5 wherein said $NH_4 \cdot HF_2$ is an essential ingredient and is present in an amount up to 1% by weight.

7. An electroconductive material having a resistivity of up to about 0.20 ohm per square consisting essentially of about 10% to 50% by weight of a substantially non-conducting glass, 20% to 85% by weight of at least one metal selected from the group consisting of silver, gold, platinum, palladium, rhodium, nickel, chromium, cadmium, copper, and aluminum of which at least one metal is nickel, and an effective amount up to 60% by weight of at least one semiconductor, effective to increase the electrical resistivity of said material without said semiconductor.

8. An electroconductive material having a resistivity of up to about 0.20 ohm per square consisting essentially of about 20% to 25% by weight of a substantially non-conducting glass, 35% to 80% by weight of at least one metal selected from the group consisting of aluminum, magnesium, copper, silver, gold, zinc, cadmium, mercury, gallium, indium, thallium, germanium, tin, lead, antimony, bismuth, tellurium, polonium, scandium, yttrium, titanium, zirconium, hafnium, vanadium, niobium, tantalum, chromium, molybdenum, tungsten, iron, ruthenium, osmium, cobalt, rhodium, iridium, nickel, palladium, and platinum, an effective amount up to 40% by weight of at least one semiconductor selected from the group consisting of SiC, $SnO_2$, and $Sb_2O_3$, effective to increase the electrical resistivity of said material without said semiconductor, and 0 to 1% by weight of $NH_4 \cdot HF_2$.

9. The electroconductive material of claim 8 wherein said $NH_4 \cdot HF_2$ is an essential ingredient and is present in an amount up to 1% by weight.

10. The electroconductive material of claim 8 wherein said metal is selected from the group consisting of silver, gold, platinum, palladium, rhodium, nickel, chromium, cadmium, copper and aluminum.

11. A heating element comprising an electrically non-conductive substrate and a coating applied to said substrate, said coating having a resistivity of up to about 0.20 ohm per square and consisting essentially of about 20% to 85% by weight of finely divided particles of at least one metal selected from the group consisting of aluminum, magnesium, copper, silver, gold, zinc, cadmium, mercury, gallium, indium, thallium, germanium, tin, lead, antimony, bismuth, tellurium, polonium, scandium, yttrium, titanium, zirconium, hafnium, vanadium, niobium, tantalum, chromium, molybdenum, tungsten, iron, ruthenium, osmium, cobalt, rhodium, iridium, nickel, palladium, and platinum, an effective amount up to 60% by weight of finely divided particles of at least one semiconductor selected from the group consisting of SiC, $SnO_2$, and $Sb_2O_3$, effective to increase the electrical resistivity of said coating without said semiconductor, 0 to 1% by weight of $NH_4 \cdot HF_2$, and 10% to 50% by weight of a coalesced substantially non-conducting glass having a melting temperature lower than the melting temperature of said metals and semiconductors, said metals and semiconductors being dispersed throughout said glass in an electrically conductive relationship.

12. The heating element of claim 11 wherein said metal is selected from the group consisting of silver, gold, platinum, palladium, rhodium, nickel, chromium, cadmium, copper, and aluminum.

13. The heating element of claim 11 wherein said $NH_4 \cdot HF_2$ is an essential ingredient and is present in an amount up to 1% by weight.

14. The method of making an elecrtical resistance element comprising mixing 40% to 60% by weight of a volatile liquid vehicle and 60% to 40% by weight of finely divided solid constituents, said solid constituents comprising 10% to 50% by weight of a substantially non-conductive glass, 20% to 85% by weight of at least one metal selected from the group consisting of aluminum, magnesium, copper, silver, gold, zinc, cadmium, mercury, gallium, indium, thallium, germanium, tin, lead, antimony, bismuth, tellurium, polonium, scandium, yttrium, titanium, zirconium, hafnium, vanadium, niobium, tantalum, chromium, molybdenum, tungsten, iron, ruthenium, osmium, cobalt, rhodium, iridium, nickel, palladium, and platinum, an effective amount up to 60% by weight of at least one semiconductor selected from the group consisting of SiC, $SnO_2$, and $Sb_2O_3$, effective to increase the electrical resisitivity of said solid constituents without said semiconductor, and 0 to 1% by weight of $NH_4 \cdot HF_2$, applying a coating of the mixture to a non-conductive substrate, heating said coating to a temperature above the melting temperature of said glass and below the melting temperature of the metals and semiconductors thereafter cooling said coating, said coating having a resistivity of up to about 0.20 ohm per square and said non-conductive substrate comprising said electrical resistance element.

15. The method of claim 14 wherein said metal is selected from the group consisting of silver, gold, platinum, palladium, rhodium, nickel, chromium, cadmium, copper and aluminum.

16. An electroconductive material having a resistivity of up to about 0.20 ohm per square consisting essentially of about 20% to 25% by weight of a substantially non-conductive glass, 35% to 80% by weight of at least one metal selected from the group consisting of aluminum, magnesium, copper, silver, gold, zinc, cadmium, mercury, gallium, indium, thallium, germanium, tin, lead, antimony, bismuth, tellurium, polonium, scandium, yttrium, titanium, zirconium, hafnium, vanadium, niobium, tantalum, chromium, molybdenum, tungsten, iron, ruthenium, osmium, cobalt, rhodium, iridium, nickel, palladium, and platinum, and 5% to 40% by weight of at least one semiconductor.

17. The electroconductive material of claim 16 wherein said metal is selected from the group consisting of silver, gold, platinum, palladium, rhodium, nickel, chromium, cadmium, copper, and aluminum.

18. The electroconductive material of claim 16 wherein said semiconductor is selected from the group consisting of silicon carbide, metal oxides, tellurides, stannates, antimonates, titanates, vanadates, arsenates, manganates, molybdates, and mixtures thereof.

19. The electroconductive material of claim 16 wherein said semiconductor comprises as an essential ingredient up to 1% by weight $NH_4 \cdot HF_2$.

20. A heating element comprising an electrically non-conductive substrate and a coating applied to said substrate, said coating having a resistivity of up to about 0.20 ohm per square and consisting essentially of about 20% to 85% by weight of finely divided particles of at least one metal selected from the group consisting of silver, gold, platinum, palladium, rhodium, nickel, chromium, cadmium, copper, and aluminum, 5% to 40% by weight of finely divided particles of at least one semiconductor selected from the group consisting of SiC, $SnO_2$, and $Sb_2O_3$, 0 to 1% by weight of $NH_4 \cdot HF_2$, and 10% to 50% by weight of a coalesced substantially non-conducting glass having a melting temperature lower than the melting temperature of said metals and semiconductors, said metals and semiconductors being dispersed throughout said glass in an electrically conductive relationship.

21. The method of making an electrical resistance element comprising mixing 40% to 60% by weight of a volatile liquid vehicle and 60% to 40% by weight of finely divided solid constituents, said solid constituents comprising 10% to 50% by weight of a substantially non-conductive glass, 20% to 85% by weight of at least one metal selected from the group consisting of silver, gold, platinum, palladium, rhodium, nickel, chromium, cadmium, copper, and aluminum, 5% to 40% by weight of at least one semiconductor selected from the group consisting of SiC, $SnO_2$, and $Sb_2O_3$, and 0 to 1% by weight of $NH_4 \cdot HF_2$, applying a coating of a mixture to a non-conductive substrate, heating said coating to a temperature above the melting temperature of said glass and below the melting temperature of the metals and semiconductors, thereafter cooling said coating, said coating having a resistivity of up to about 0.20 ohm per square and said non-conductive substrate comprising said electrical resistance element.

22. The method of claim 21 wherein said $NH_4 \cdot HF_2$ is an essential ingredient and is present in an amount up to 1% by weight.

23. An electroconductive material having a resistivity of up to about 0.20 ohm per square consisting essentially of about 20% to 25% by weight of a substantially non-conductive glass, 35% to 80% by weight of at least one metal selected from the group consisting of silver, gold, platinum, palladium, rhodium, nickel, chromium, cadmium, copper, and aluminum of which at least one is silver, 5% to 40% by weight of at least one semiconductor selected from the group consisting of SiC, $SnO_2$, and $Sb_2O_3$, and 0 to 1% by weight of $NH_4 \cdot HF_2$.

24. An electroconductive material having a resistivity of up to about 0.20 ohm per square consisting essentially of about 10% to 50% by weight of a substantially non-conducting glass, 20% to 85% by weight of at least one conductive metal, an effective amount up to 60% by weight of at least one inorganic semiconductor, effective to increase the electrical resistivity of said material without said semiconductor.

25. The electroconductive material of claim 24 wherein said semiconductor is selected from the group consisting of silicon carbide, metal oxides, tellurides, stannates, antimonates, titanates, vanadates, arsenates, manganates, molybdates, and mixtures thereof.

26. The electroconductive material of claim 24 wherein said semiconductor comprises as an essential ingredient up to 1% by weight $NH_4 \cdot HF_2$.

27. An electroconductive material having a resistivity of up to about 0.20 ohm/square consisting essentially of about 20% to 25% by weight of a substantially non-conducting glass, 35% to 80% by weight of at least one conductive metal, and 5% to 40% by weight of at least one semiconductor.

28. An electroconductive material consisting essentially of about 20% to 25% by weight of a substantially non-conducting glass, 35% to 80% by weight of at least one conductive metal, and 5% to 40% by weight of at least one semiconductor.

29. An electroconductive material consisting essentially of about 10% to 50% by weight of a substantially nonconducting glass, 20% to 85% by weight of at least one conductive metal, an effective amount of up to 60% by weight of at least one inorganic semiconductor, effective to increase the electrical resistivity of said material without said semiconductor.

References Cited

UNITED STATES PATENTS

| | | | |
|---|---|---|---|
| 2,371,211 | 3/1945 | Barrington | 252—512 XR |
| 2,415,036 | 1/1947 | Quinn | 252—512 |
| 2,588,920 | 3/1952 | Green | 117—229 |
| 2,882,187 | 4/1959 | Kwote | 117—230 |
| 2,950,996 | 8/1960 | Place et al. | 252—514 XR |
| 3,044,901 | 7/1962 | Garnsworthy | 252—518 XR |

OTHER REFERENCES

Gregory, Uses and Applications of Chemicals and Related Materials, vol. II (1944), p. 16, Reinhold.

WILLIAM L. JARVIS, Primary Examiner

U.S. Cl. X.R.

106—1, 49; 117—160, 222, 227; 252—512, 513, 514, 518